US008243065B2

(12) United States Patent                (10) Patent No.:     US 8,243,065 B2
    Kim                                   (45) Date of Patent:     Aug. 14, 2012

(54) IMAGE PRESENTATION METHOD AND APPARATUS FOR 3D NAVIGATION AND MOBILE DEVICE INCLUDING THE APPARATUS

(75) Inventor: Ho Seung Kim, Gyeonggi-Do (KR)

(73) Assignee: Core Logic, Inc., Seoul (KR)

( * ) Notice: Subject to any disclaimer, the term of this patent is extended or adjusted under 35 U.S.C. 154(b) by 652 days.

(21) Appl. No.: 12/433,789

(22) Filed: Apr. 30, 2009

(65) Prior Publication Data
    US 2009/0273601 A1    Nov. 5, 2009

(30) Foreign Application Priority Data
    Apr. 30, 2008    (KR) .......................... 10-2008-0040722

(51) Int. Cl.
    *G06T 17/50*    (2006.01)
(52) U.S. Cl. ........................................ 345/419; 345/427
(58) Field of Classification Search .................. 345/419, 345/427
    See application file for complete search history.

(56) References Cited

U.S. PATENT DOCUMENTS

| 6,744,442 B1 * | 6/2004 | Chan et al. ..................... 345/587 |
| 2007/0024616 A1 * | 2/2007 | Goyne et al. ................... 345/423 |
| 2008/0150955 A1 * | 6/2008 | Ndjiki-Nya .................... 345/582 |
| 2008/0183382 A1 * | 7/2008 | Asai et al. ...................... 701/210 |
| 2009/0128558 A1 * | 5/2009 | Morello et al. ................. 345/420 |

FOREIGN PATENT DOCUMENTS

KR    10-2000-0069744 A    11/2000

* cited by examiner

*Primary Examiner* — Kimbinh T Nguyen
(74) *Attorney, Agent, or Firm* — Nath, Goldberg & Meyer; Jerald L. Meyer; Robert T. Burns

(57) ABSTRACT

Provided are a high-performance, real-time image presentation method and apparatus for a 3-dimensional (3D) navigation system that may be used in a mobile environment since a small amount of data and a simple algorithm are used, and a mobile device including the image presentation apparatus. The image presentation method includes: loading two-dimensional (2D) map data and pattern control map (PCM) data; analyzing the 2D map data; generating 3D image data on a region that is analyzed as requiring 3D images in the analyzing of the 2D map data, based on the PCM data; and displaying 3D images on a display based on the 2D map data and the 3D image data.

13 Claims, 14 Drawing Sheets

ROUNDABOUT CROSSING

CLOVER-LEAF CROSSING

TRIANGULAR DIVERGING CROSSING

DIAMOND CROSSING

TRUMPET CROSSING

FOUR-LEVEL CROSSING

| | Real 3D Data | Virtual 3D Data | Data Size Ratio |
|---|---|---|---|
| Terrain Generation | Position, Normal, Texcoord * 4byte = 32 byte | 1 pixel= 1byte | 32 Times |
| Floor Plane Generation | 140 x 24 Vertex x 32 Byte = 107Kbyte | 140* (Index + scale + height)= 4Kbyte | 26.75 Times |
| Pattern control map | | 6 x 8 pixel(RGB) = 144 byte | 743 Times |
| Texture Generation | 140 x 128 x 128 Byte = 2.3Mbyte | 140 x 100 byte = 14Kbyte | 164.3 Times |

IMAGE PRESENTATION METHOD AND APPARATUS FOR 3D NAVIGATION AND MOBILE DEVICE INCLUDING THE APPARATUS

CLAIM OF PRIORITY

This application claims the benefit of Korean Patent Application No. 10-2008-0040722, filed on Apr. 30, 2008, in the Korean Intellectual Property Office, the disclosure of which is incorporated herein in its entirety by reference.

BACKGROUND

The present disclosure relates to 3-dimensional (3D) navigation, and more particularly, to navigation for 3D image presentation in a mobile device, and a 3D image presentation method used in the navigation system.

Currently, commercially available navigation systems display a planar 2-dimensional (2D) map or a perspective view in which an object may be seen three-dimensionally, and display only pieces of terrain that may be indistinct in 2D, such as crossings, tunnels, or the like, as 3-dimensional (3D) images.

However, if a navigation system displays all facilities in 3D, it would be convenient for a user to switch their visual point and to compare displayed images with the actual terrain to decide on which direction to head. However, in order to model the appearances of terrain and buildings in 3D, high-resolution aerial photographs and laser profilers, or the like are required. In addition, in order to obtain texture data on the buildings, photographs of the exterior of the building are required. In addition, it is costly to take these photographs and it also takes a considerable amount of time to 3D-model the terrain and buildings based on the photographs. For these reasons, it is costly to create contents for 3D navigation systems.

Recently, various algorithms for generating 3D images of highly dense cities or buildings have been researched and applied to high-specification PCs for 3D gaming. However, for 3D-image presentation using such algorithms, excessive data for modeling topological irregularities and a large memory size for the data are required. In addition, it is impossible to provide the data in real-time, and there is a limit to applying the algorithms to mobile devices for navigation since such algorithms are executed only in high-specification PCs that can process a large amount of data.

SUMMARY

The present disclosure provides a high-performance, real-time image presentation method and apparatus for a 3-dimensional (3D) navigation system that may be used in a mobile environment since a small amount of data and a simple algorithm are used, and a mobile device including the image presentation apparatus.

According to an aspect of the present disclosure, there is provided an image presentation method for three-dimensional (3D) navigation, the method comprising: loading two-dimensional (2D) map data and pattern control map (PCM) data; analyzing the 2D map data; generating 3D image data on a region that is analyzed as requiring 3D images in the analyzing of the 2D map data, based on the PCM data; and displaying 3D images on a display based on the 2D map data and the 3D image data.

The method may further comprise generating the PCM data based on actual geographical information data before the loading of the 2D map data and the PCM data. The analyzing of the 2D map data may comprise dividing the 2D map data into a road block region and a building block region. If 3D image data is required on the road block region, in the generating of the 3D image data, 3D image data on a road and a crossing may be generated using a crossing model and control points stored in a database, and if 3D image data is required on the building block region, in the generating of the 3D image data, 3D image data on a building may be generated using the PCM data and a building generation module.

The crossing model may be a 3D crossing model generated to correspond to an actual crossing, and the control points may be intersecting points of roads that are used to modify the crossing model. If 3D image data on the road and the crossing are generated, a 3D image of the crossing may be generated by assigning a type of crossing to the crossing in the 2D map data and linking the crossing in the 2D map data to a crossing model corresponding to the type of crossing in the 2D map data using the control points.

The PCM data may include data on the distribution of buildings, the density of buildings, the area of a building site, the height of a building, and the type of building, and the generating of the 3D image data may comprise: dividing the building block region into a plurality of sub-block regions respectively corresponding to individual building sites; generating the appearance of a building in a sub-block region; and generating an exterior texture of the building.

According to another aspect of the present disclosure, there is provided an image presentation apparatus for 3D navigation, the apparatus comprising: a map data analysis unit that analyzes 2D map data stored in a storage medium to divide the 2D map data into a road block region and a building block region; a road generation unit that generates data on roads and crossings in the road block region; and a building generation unit that divides the building block region into a plurality of sub-block regions corresponding to individual building sites and generates data on a building in a sub-block region based on pattern control map (PCM) data stored in the storage medium.

The apparatus may further comprise: an image adjustment unit that adjusts a 3D image in consideration of the position or the angle of view of a camera; and an altitude representation unit that altitudes of terrain using a Real-Time Optimally-Adapting Mesh (ROAM) method.

According to another aspect of the present disclosure, there is provided a mobile device comprising: a storage medium that stores two-dimensional (2D) map data and pattern control map (PCM) data; an application processor for three-dimensional (3D) navigation that generates 3D image data on buildings using the 2D map data and the PCM data stored in the storage medium; and a display unit that displays 3D images of the buildings.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

Figure 1A:
FIGS. 1A and 1B are 3-dimensional (3D) modeling images obtained using an image presentation method according to an embodiment of the present disclosure.

The present disclosure will now be described more fully with reference to the accompanying drawings, in which exemplary embodiments of the disclosure are shown. It will also be understood that when an element is referred to as being connected "to" another element, it can be directly to the other element, or intervening elements may also be present. In the drawings, the structures or sizes of elements are exaggerated for clarity. Like reference numerals in the drawings denote like elements, and thus their description will be omitted. The terms used throughout the specification should be considered in descriptive sense only and not for purposes of limitation.

Figure 1B:
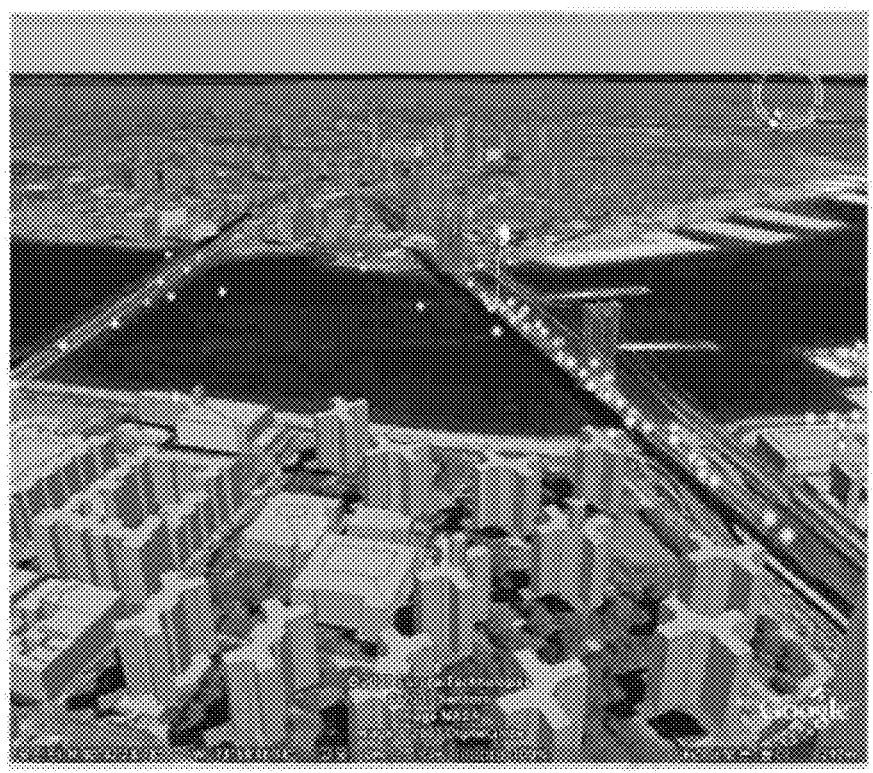

FIGS. 1A and 1B are 3-dimensional (3D) modeling images obtained using an image presentation method according to an embodiment of the present disclosure.

FIG. 1A is a 3D modeling image of a city including index buildings, and FIG. 1B is a 3D modeling image of a city created without considering index buildings.

Herein, index buildings refer to landmark buildings that are well known in an urban area, and data on the appearances of these buildings are easily attainable on the Internet or the like.

Thus, these index buildings may be modeled more realistically. In FIG. 1A, buildings with windows are index buildings.

As described above, since a large amount of data and a high-performance processor are required to express urban buildings and roads in real-time as 3D images using a conventional 3D graphics method, it is difficult to implement a 3D image presentation in a mobile device that has a small memory capacity. However, when 3D images are represented using a method that will be described below, the amount of required data may be markedly reduced so that a 3D navigation system may be realized in a mobile device.

Figure 2:
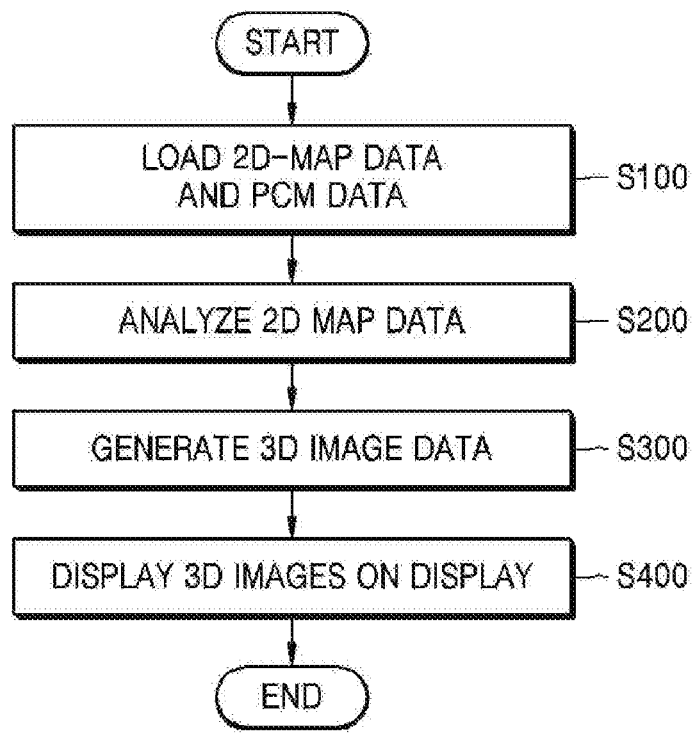
FIG. 2 is a flowchart of an image presentation method for a 3D navigation system, according to an embodiment of the present disclosure.

FIG. 2 is a flowchart of an image presentation method for a 3D navigation system, according to an embodiment of the present disclosure.

Referring to FIG. 2, the image presentation method according to the present embodiment involves loading 2D-map data and pattern control map (PCM) data at a map data analysis unit of an application processor (operation S100). Herein, 2D-map data refers to general 2D graphics image data that is obtained using a 2D vector engine, such as OpenVG, and that has been applied in various, currently available 2D navigation systems. The 2D map data is markedly small in amount as compared to 3D map data.

In addition, PCM data, which is used to obtain information on actual terrain or buildings, may include information on the distribution of buildings, the density of buildings, the area of a building site, the height of a building, the type of building, or the like. The PCM data may be obtained from aerial photographs, land registration maps, or the like.

However, PCM data does not provide accurate data on the appearances of buildings, or the like. In other words, the PCM data just includes a minimal amount of data required to implement 3D images according to the present disclosure. If the PCM data includes accurate data on each building, terrain or the like, the amount of the PCM data is similar to the amount of data used in conventional 3D graphics images. Thus, it would be meaningless to use the PCM data including accurate data.

However, the PCM data may include data on the index buildings described above. Since most users are aware of the appearances of the index buildings, the index buildings may be presented and perceived as more realistic 3D images.

Next, the loaded 2D map data is analyzed at the map data analysis unit (operation S200). The reason for analyzing the 2D map data is to divide the 2D map data into a road block region and a building block region. Most roads, excluding elevated roads or crossings, have a 2D structure, and there is no need for 3D image of such roads. However, at least the elevated roads or crossings need to be represented as 3D images.

After the road block region and the building block region are divided by analyzing the 2D map data, 3D image data on each of the road block region and the building block region is generated through a road generation unit and a building generation unit of the application processor (operation S300). A description of generating the 3D image data will be provided below in detail with reference to FIG. 3A.

In addition, the altitudes of the overall terrain may also be presented in operation S300, as will be described below with reference to FIGS. 3A through 3C. 3D images of, for example, buildings, may vary according to the location or the angle of view of a camera. Thus, data on such 3D images may also be generated.

3D graphic images are displayed on a display, such as a liquid crystal display (LCD), based on the 3D image data, using a conventional 3D graphics engine, such as OpenGL or DirectX (operation S400).

The 3D image data generated according to the present embodiment is significantly small in amount as compared to conventional 3D image data and occupies a small region of memory, and thus may be displayed on a mobile device using a 3D graphics engine. Available 3D graphics engines may include OpenGL or DirectX, which have conventionally been used. However, an exclusive graphics engine for 3D image data according to the present embodiment may be used.

The conventional 3D graphics engines, i.e., OpenGL or DirectX, may include additional functions that are unnecessary to implement 3D navigation systems since the conventional 3D graphics engines have been devised for high-specification PCs. Meanwhile, the exclusive graphics engine for a 3D navigation system may have only essential functions that work with a small amount of data, and thus may be efficient for implementing 3D navigation.

Figure 3A:
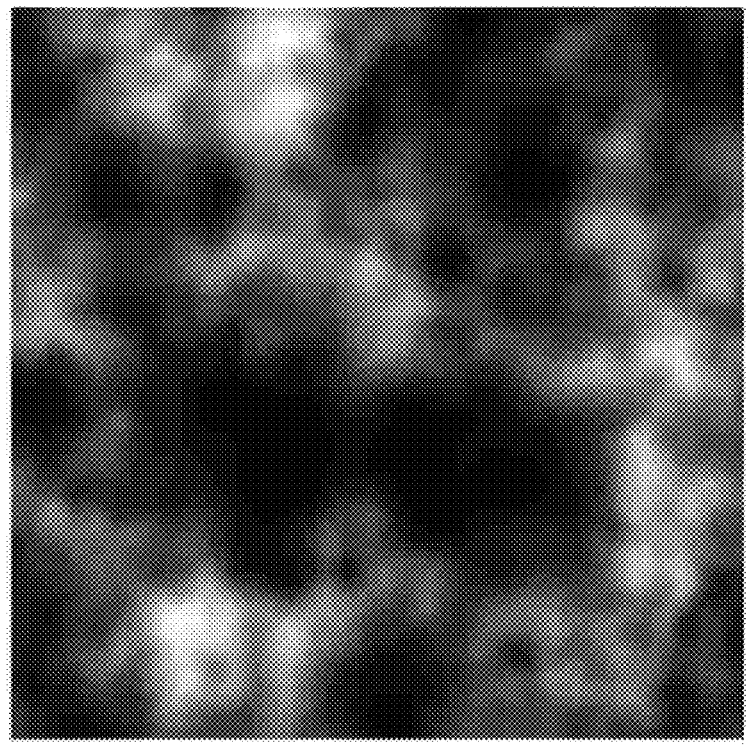
FIGS. 3A through 3C are images illustrating a method of modeling the altitudes of the terrain in operation S300 of the method of FIG. 2, according to an embodiment of the present disclosure.
Figure 3B:
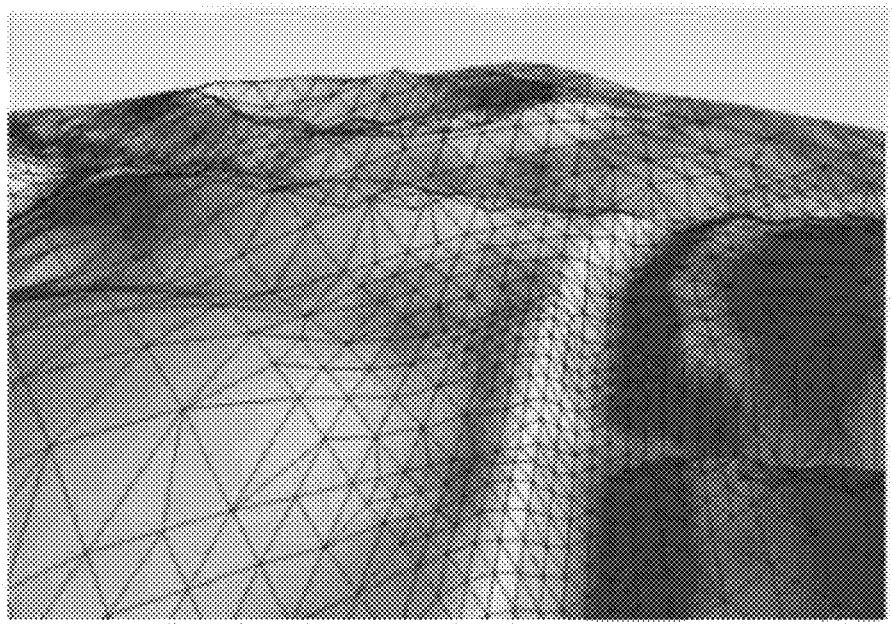
Figure 3C:
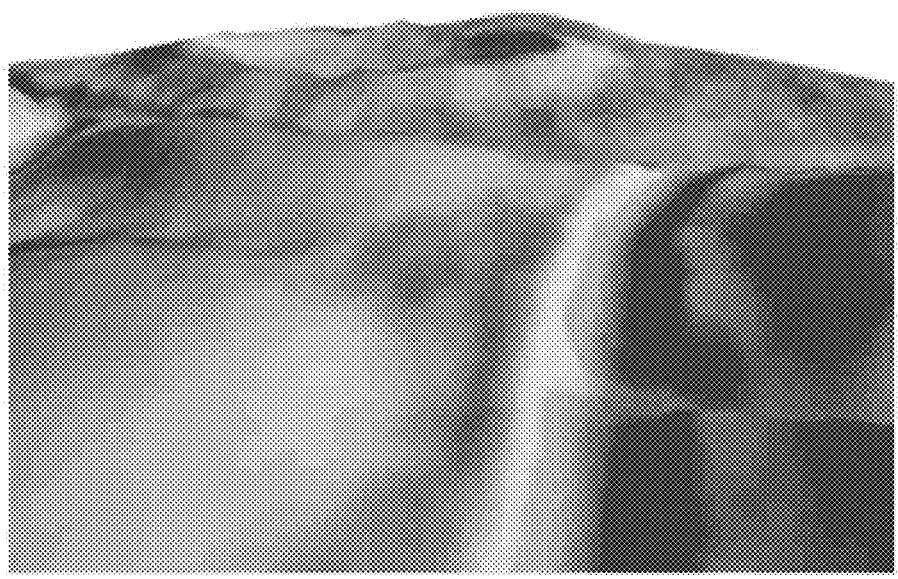

FIGS. 3A through 3C are images illustrating a method of modeling the altitudes of the terrain in operation S300 of the method of FIG. 2, according to an embodiment of the present disclosure.

FIG. 3A is a 2D gray-scale raster image representing altitudes on a map based on contour lines. That is, in FIG. 3A, altitudes are expressed on a gray-scale.

FIG. 3B is a terrain mesh image created based on the 2D gray-scale raster image of FIG. 3A. FIG. 3C is a completed 3D graphics image of terrain altitudes that is created by deleting the terrain mesh lines illustrated in FIG. 3B.

The terrain mesh may be generated using an Real-Time Optimally-Adapting Mesh (ROAM) method. A mesh including altitude information on a particular region may be generated in a single pixel. If altitudes in a region having the same size are represented using polygons according to a conventional method, it takes 32 bytes to represent the altitudes. Meanwhile, a single pixel may contain 1-byte of information. Thus, the amount of data used in the ROAM method may be reduced to be 32 times less than that used in the conventional method. In addition, a rendering load may be reduced by applying a level-of-detail (LOD).

Figure 4A:
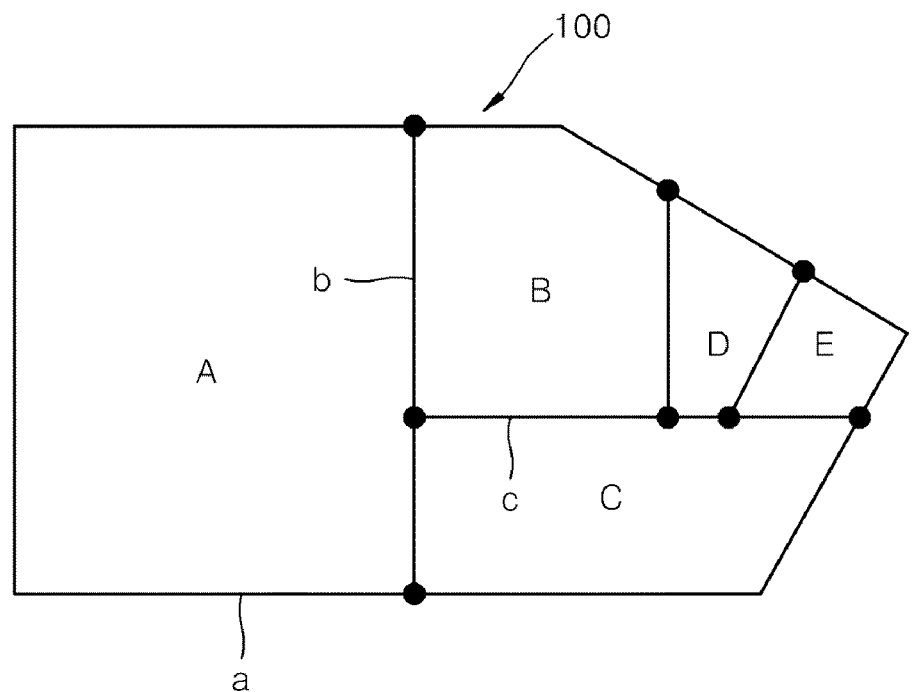
FIGS. 4A and 4B are plan views for explaining a method of dividing a building block region into sub-blocks in operation S200 of the method of FIG. 2, according to an embodiment of the present disclosure.
Figure 4B:
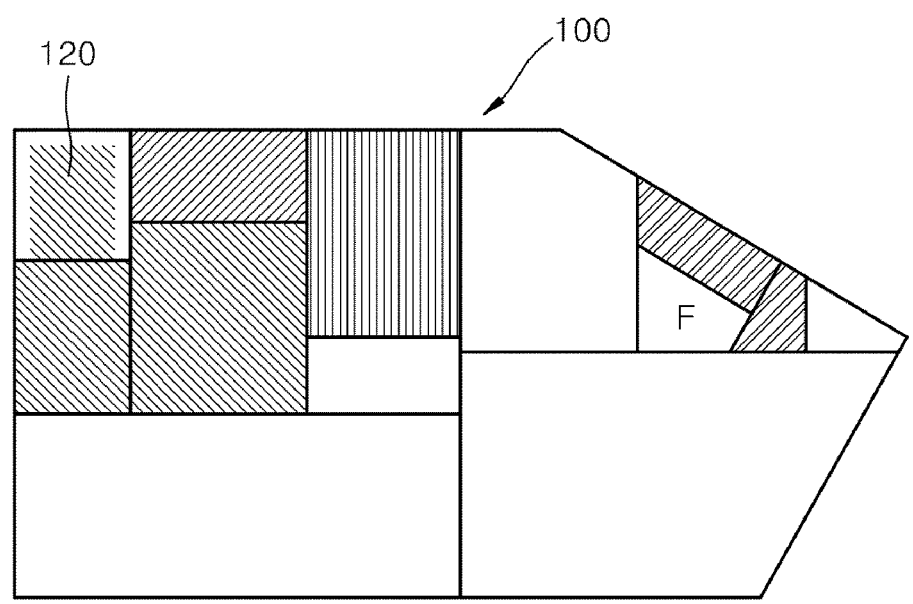

FIGS. 4A and 4B are plan views for explaining a method of dividing building block region into sub-blocks in operation S200 of the method of FIG. 2, according to an embodiment of the present disclosure.

In the 2D map data analysis (operation S200 of FIG. 2) described above, the 2D map data is divided into road block regions and building block regions. In general, building block regions are located between road block regions. In addition, a building is appropriately arranged in each building block region. Buildings have a predetermined shape and size, and it is impossible to model all the buildings. However, modeling of buildings to be arranged in some of the building block regions may be automatically performed in real-time.

An embodiment includes a method of acquiring the density and sizes of buildings in a building block region based on the PCM data and dividing the building block region to the sizes of actual buildings based on the acquired density and sizes of the buildings.

The building block regions, which are divided from the road block regions in the 2D map data analysis (operation S200), are considerably large regions. Thus, each of the building block regions may be further divided into sub-blocks each having a size of a building so that the buildings are respectively arranged within the sub-blocks. FIG. 4A illustrates the method of dividing a building block region 100 into sub-blocks, according to an embodiment.

The method of dividing the building block region 100 according to the present embodiment may involve selecting the largest side ("a" in FIG. 4A) of the building block region and drawing a vertical line from a point dividing the largest side in a predetermined ratio, for example, in a ratio of 0.3 to 0.7, assuming that the largest side has a length of 1, towards an opposite side to the largest side. In FIG. 4A, line b defining a sub-block A is the line first drawn from the largest side of the building block region. Next, the second largest side ("b" in FIG. 4A) of the building block region is chosen and the building block region is further divided according to the above-described process. In FIG. 4A, line c defining a sub-block C is the line drawn from the second largest side of the building block region. The above-described processes are repeated on each of the building block regions to further divide the building block region into sub-blocks until a sub-block corresponding to a minimal building block size, which is obtained from the PCM data, is obtained.

Referring to FIG. 4B, buildings are respectively arranged within the sub-blocks, which are divided by the method described with reference to FIG. 4A, to fit in the sub-blocks. Alternatively, as in a sub-block 120, the size of a building may be appropriately reduced before being arranged within the sub-block 120. In addition, buildings may be arranged in sub-blocks close to outer sides of the building block region 100.

For a sub-block F, which is not close to an outer side of the building block region 100, vehicles are not able to access the sub-block F. In addition, the sub-block F is invisible from the outside of the building block region 100. Such a block may be combined with an adjacent sub-block or may be removed. If such a sub-block is combined with another sub-block, this may result in various plan views. Otherwise, if removed, the sub-block may appear as a parking zone or a green zone.

Figure 4C:
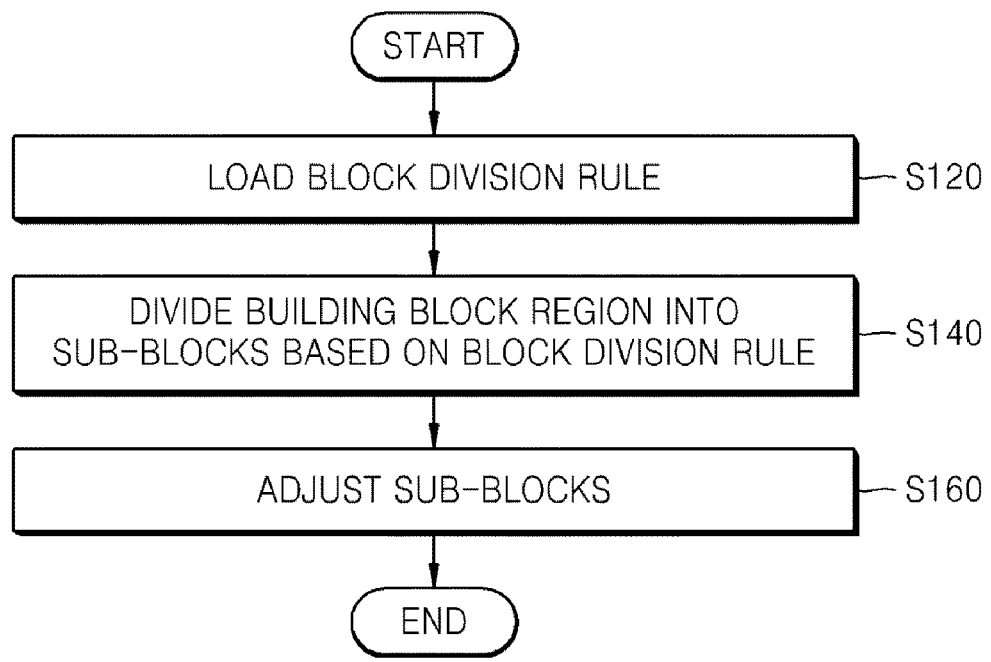
FIG. 4C is a flowchart of a method of dividing a building block region into sub-blocks, according to another embodiment of the present disclosure.

FIG. 4C is a flowchart of a method of dividing a building block region into sub-blocks by a block division module of the building generation unit, according to another embodiment of the present disclosure.

Referring to FIG. 4C, the method according to the present embodiment may involve loading a block division rule from a block division module (operation S120). Next, a building block region is divided into sub-blocks based on the block division rule (operation S140). Next, the sub-blocks are adjusted by removing or combining (operation S160). The operation of dividing of the building block region into sub-blocks (S140) is the same as described above with reference to FIGS. 4A and 4B, and a detailed description thereof will be omitted.

Figure 5A:
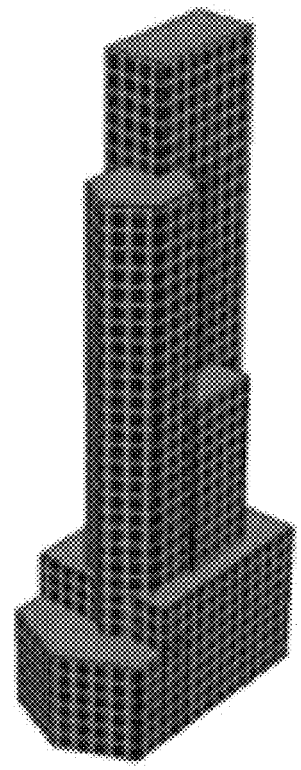
FIGS. 5A and 5B are perspective views showing that a complicated building may be represented as a combination of simple polygons.
Figure 5B:
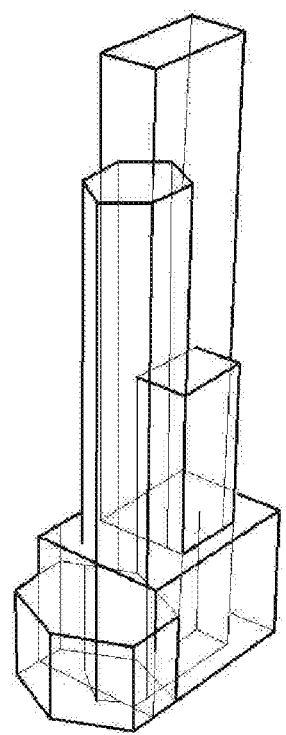

FIGS. 5A and 5B are perspective views showing that a complicated building may be represented as a combination of simple polygons.

FIG. 5A is a perspective view of an actual building structure. In order to represent such a building using polygons according to a conventional method, a huge amount of data is required due to the complexity of the building structure. In particular, a general 3D object for such a building requires a number of vertices and faces. However, geometrically, buildings do not include a complicated polygonal shape, and rather are built by vertically stacking a plurality of floor planes having an identical shape. In addition, each floor plane may consist of a combination of polygons. Thus, most buildings may be simply represented in 3D, provided that floor planes and heights are available.

FIG. 5B is a perspective view showing that a complicated building may be represented by vertically extending floor planes in column form.

These columns may be simply represented by respectively assigning heights to the floor planes, as illustrated in FIGS. 6A through 6D.

FIGS. 6A through 6D are diagrams illustrating a method of modeling the appearance of a building in operation S300 of the method of FIG. 2, according to an embodiment of the present disclosure.

Figure 6A:
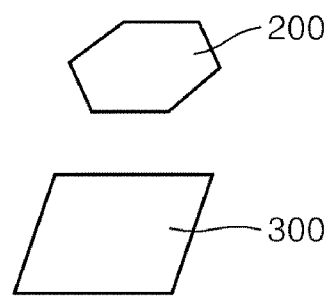
FIGS. 6A through 6D are diagrams illustrating a method of modeling the appearance of a building in operation S300 of the method of FIG. 2, according to an embodiment of the present disclosure.
Figure 6B:
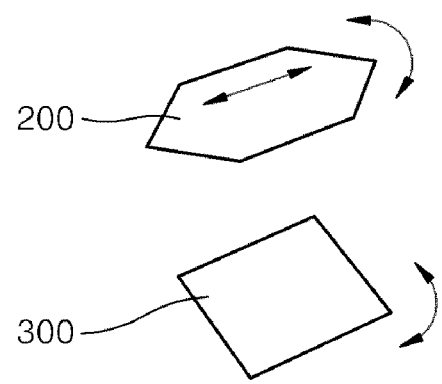
Figure 6C:
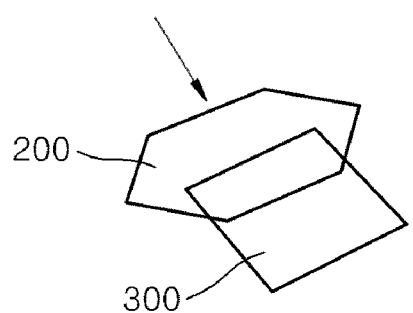
Figure 6D:
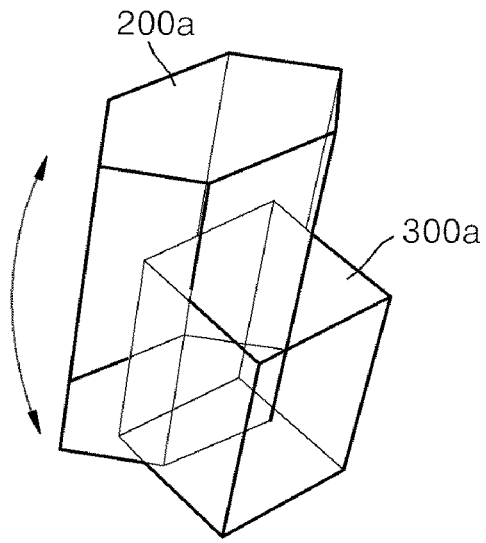

Referring to FIG. 6A, a planar figure suitable for a floor plane of the building is chosen. In the present embodiment, a hexagon 200 and a tetragon 300 may be chosen. Next, as illustrated in FIG. 6B, the hexagon 200 and the tetragon 300 are appropriately modified. The hexagon 200 may be extended in the left and right directions and be slightly turned counterclockwise. The tetragon 300 may just be slightly turned clockwise. Next, as illustrated in FIG. 6C, the hexagon 200 and the tetragon 300 are combined together. Finally, as illustrated in FIG. 6D, heights are respectively assigned to the hexagon 200 and the tetragon 300, thereby completing the appearance of the building.

Comparing the building modeling method using floor planes with a conventional method using polygons in terms of data size, when, for example, the "City Air Tower Building", a landmark building in Seoul, Korea, is modeled using 3D polygon data, the amount of required data, excluding texture data, is about 1 Kbyte using the conventional method and 200 bytes using the building modeling method. Thus, when the above-described modeling method using floor planes is used, it is enough if information on the types of polygons, shifting and extending of polygons, and heights is available, and the data size is reduced to one fifth of that of the conventional method.

Although the data size is reduced, it still takes a large amount of time to obtain floor planes of every building, and the total amount of data is still large. However, this may be overcome as follows.

Aside from index buildings, which may be used as landmarks in a navigation system, having floor plane data applicable to the above-described method, floor planes of other buildings, such as shopping centers, housings, apartments, or the like, may be automatically generated based on the PCM data.

PCM data is obtained from a plurality of raster image files. A color value of each pixel may include information on buildings within a particular region. The information on buildings may include the type of building or a building site and the density of a building, for example, whether a building is an office building or belongs to a business area, a residential area, or a green zone. In particular, on the PCM data of buildings, a green zone may be represented in green, a commercial building in gray, a residential area in yellow, a road in black, etc. In addition, on a density map of buildings, a 20 or higher-storey building may be represented in red, a 1- or 2-storey detached building may be represented in blue, etc. A floor plane of a building may be generated based on the PCM data.

When a floor plane of a building is generated based on PCM data, pattern values of buildings in a particular region are reflected in pixels of the PCM data. Thus, about 10 to 20 floor planes of a building may be generated from a single pixel. In other words, floor planes of a building in a particular region may be generated with only 3 to 9 bytes of data based on the PCM data.

Figure 6E:
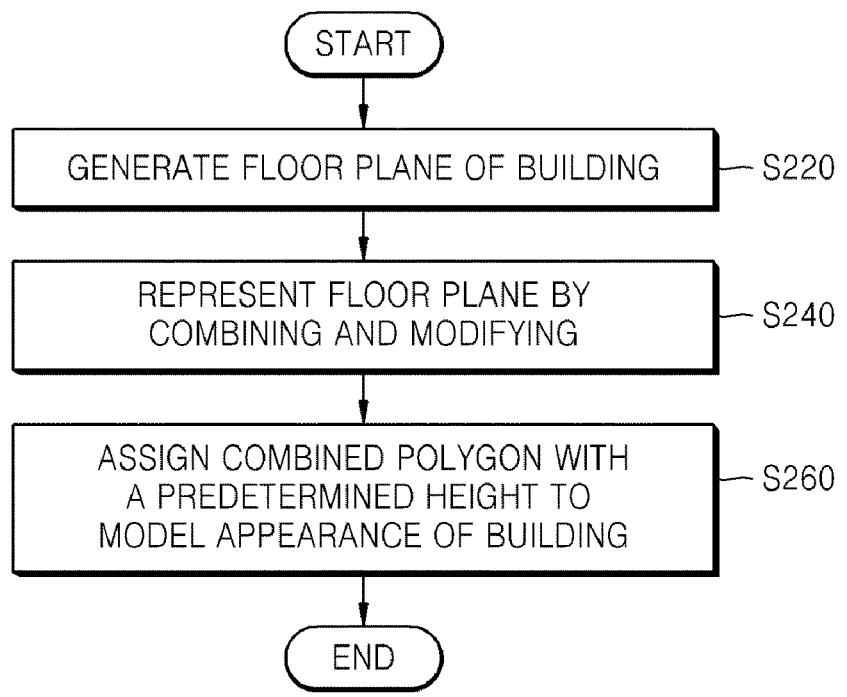
FIG. 6E is a flowchart of a method of modeling the appearance of a building, according to another embodiment of the present disclosure.

FIG. 6E is a flowchart of a method of modeling the appearance of a building by a building appearance geeration module of the building generation unit, according to another embodiment of the present disclosure.

Referring to FIG. 6E, a floor plane of a building is generated (operation S220). Next, the floor plane is represented by combining or modifying appropriate polygons (operation S240). Finally, the combined polygon is assigned with a predetermined height and then modified to model the appearance of the building to be similar to the actual building (operation S260). Modeling the appearance of the building is the same as described above with reference to FIGS. 6A through 6D, and thus, a detailed description thereof will be omitted.

Hereinafter, a method of generating texture data on the appearance of a building, according to an embodiment of the present disclosure, will be described.

If images are too small in mapping building textures, the rendering quality may be poor. The building texture may become dull even when filtering is applied. For example, if a texture size of each building is 128×128 pixels, about 7 Mbytes of data is required to represent a building block region in an area.

Thus, a combination method is required in order to reduce the size of texture data. Some buildings may have a regular pattern. For example, a series of windows and exterior walls may form a series of pattern grids, and front gates or display windows of shops may be located on the ground floor of the building.

In other words, an exterior texture of a complicated building may be generated by performing a logic operation on window colors and exterior wall colors of the building in row and column directions. The logic operation may be simplified using a pulse function. A method of generating an exterior texture of a building using a combination of pulse functions will be described with reference to FIGS. 7A through 8C.

Figure 7A:
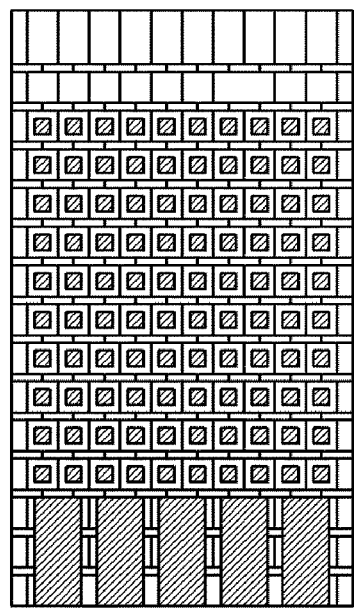
FIGS. 7A and 7C are plan views illustrating that an exterior texture of a building may be represented as a combination of simple patterns.
Figure 7B:
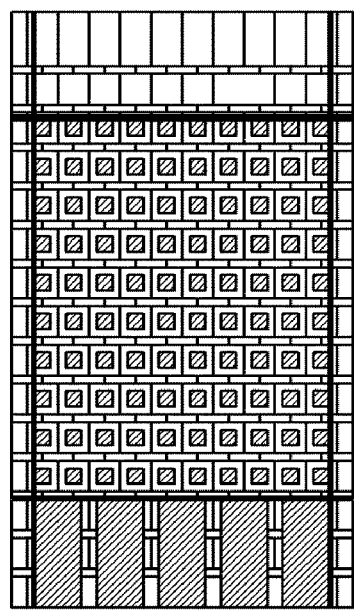
FIG. 7D is a flowchart of a method of representing an exterior texture of a building as a combination of simple patterns, according to an embodiment of the present disclosure.
Figure 7C:
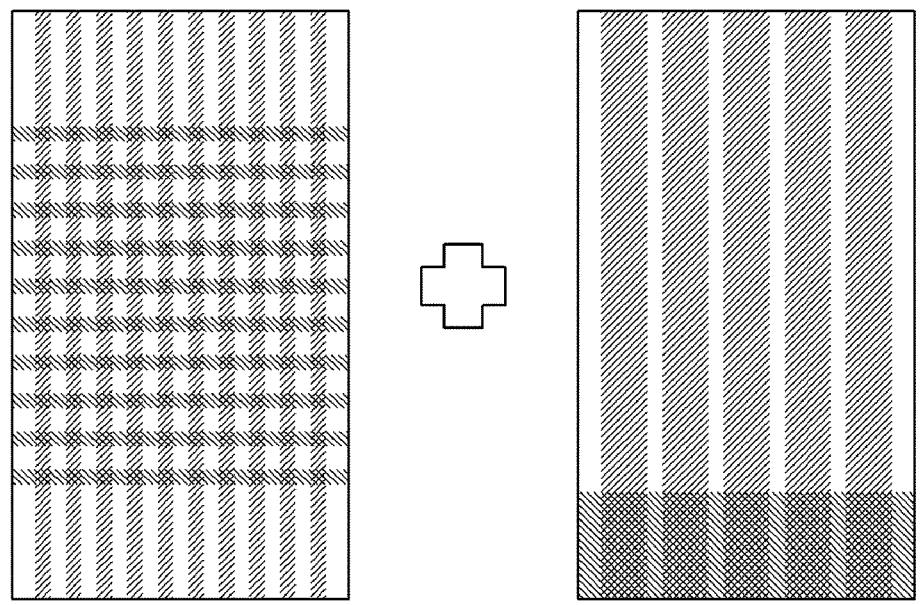

FIGS. 7A and 7C are plan views illustrating that an exterior texture of a building may be represented as a combination of simple patterns.

FIG. 7A illustrates an exterior texture of a building including a plurality of windows in upper levels and display windows in lower levels. Such an exterior pattern of the building may be divided into simple patterns. In particular, as illustrated in FIG. 7B, the exterior texture of the building may be divided into a window region and a display window region. The window region and the display window region may include a set of several color layers in the column and row directions. For convenience, the color layers are illustrated in black and white, not in colors, in FIG. 7C. Referring to FIG. 7C, the window region may be represented as a combination of a plurality of narrow bars in row and column directions. In addition, the display window region may be represented as a combination of a plurality of wide bars in the row and column directions. Finally, the overall exterior texture of the building may be generated by combining the bar patterns of the window region and the display window region. Alternatively, the bar pattern of each of the window region and the display window region that may represented as a combination of color layers may be implemented by a combination of a pulse function and a logic operation.

Figure 7D:
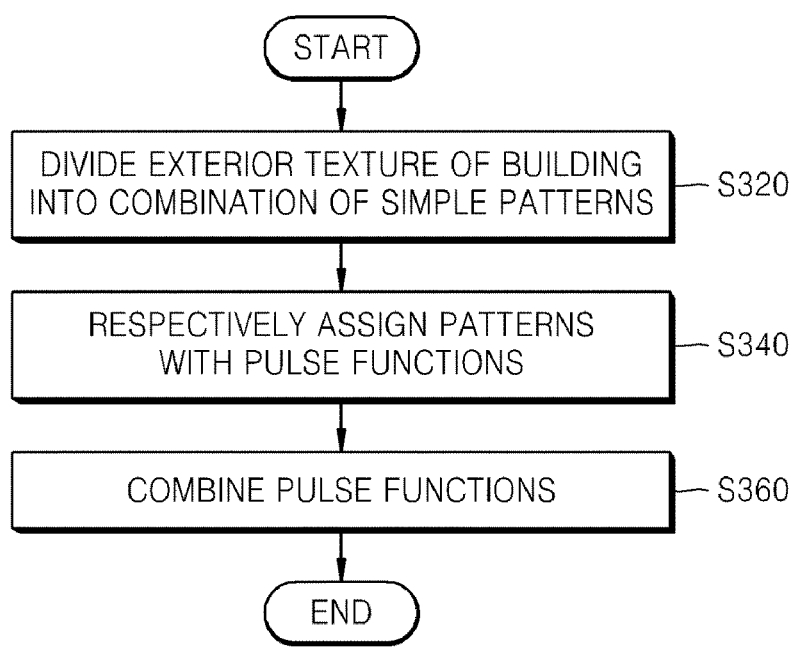

FIG. 7D is a flowchart of a method of representing an exterior texture of a building as a combination of simple patterns by a texture generation module of the building generation unit, according to an embodiment of the present disclosure.

Referring to FIG. 7D, an exterior texture of a building is divided into a combination of simple patterns (operation S320). Next, the patterns are respectively assigned with pulse functions (operation S340). The final exterior texture of the building is generated by combining the pulse functions (operation S360). Descriptions of the dividing of the exterior texture into a combination of simple patterns (S320) has already been provided with reference to FIGS. 7A through 7C, and will be omitted. Hereinafter, assigning the patterns with their respective pulse functions (S340) and combining the pulse functions (S360) will be described with reference to FIGS. 8A through 8C.

Figure 8A:
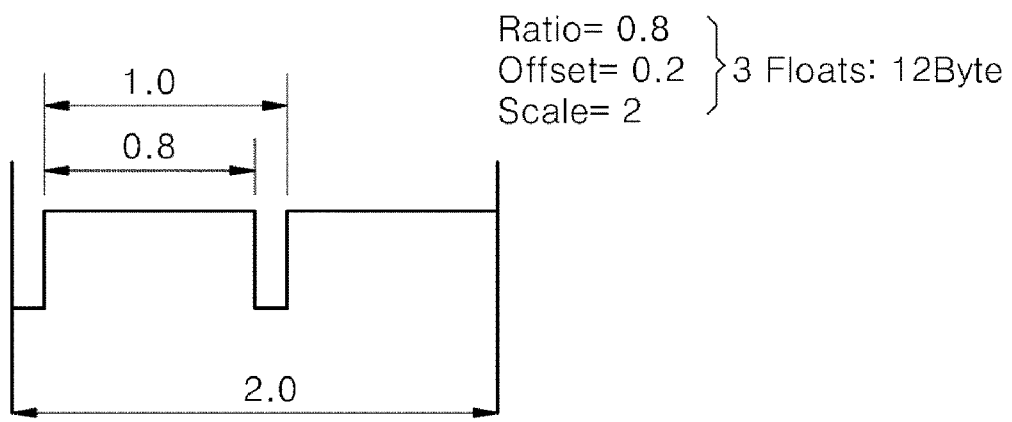
FIGS. 8A through 8C are diagrams illustrating a method of representing an exterior texture of a building as a combination of pulse functions, according to another embodiment of the present disclosure.
Figure 8B:
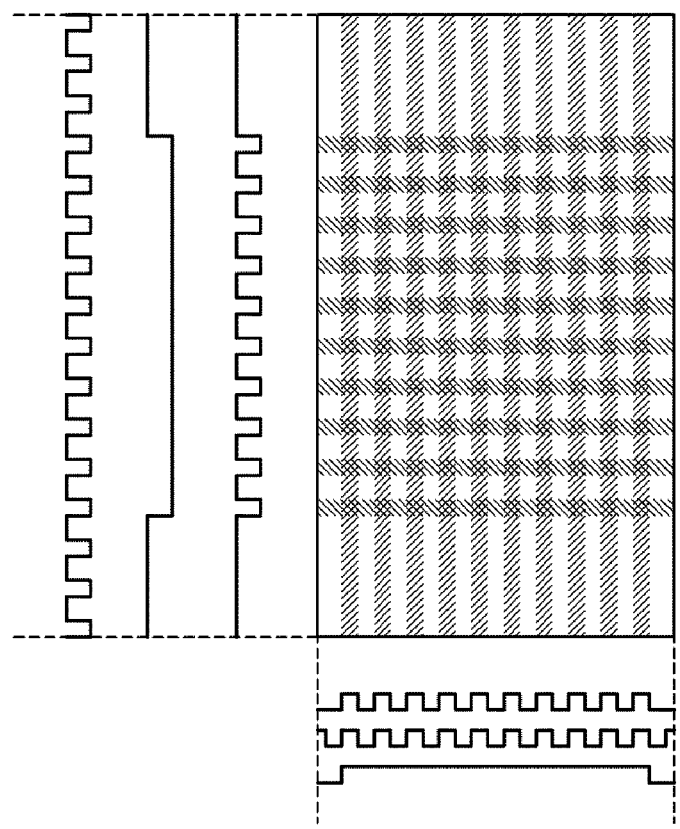
Figure 8C:
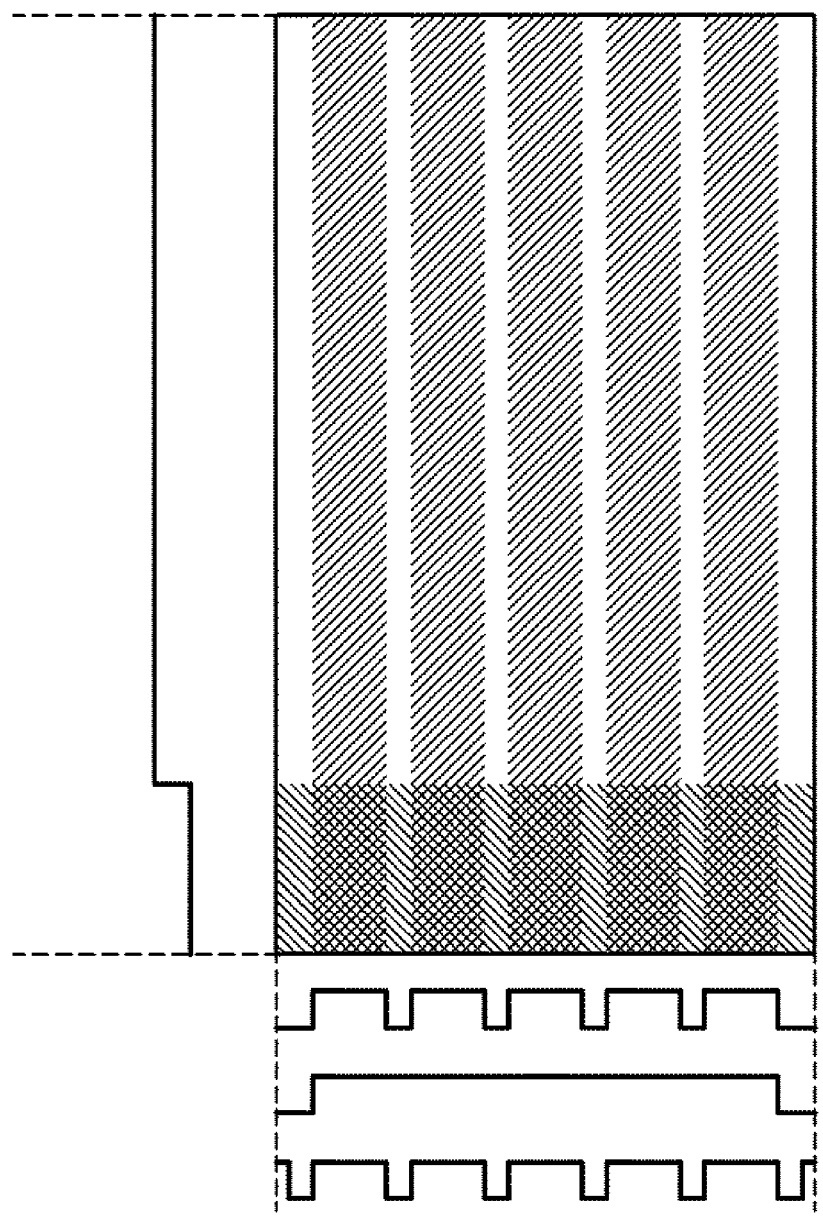

FIGS. 8A through 8C are diagrams illustrating a method of representing an exterior texture of a building as a combination of pulse functions, according to another embodiment of the present disclosure.

FIG. 8A illustrates a pulse function having a pulse pattern representing different degrees of brightness. That is, a high pulse of the pulse pattern corresponds to a dark region, and a low pulse of the pulse pattern corresponds to a light region. The pulse function as illustrated in FIG. 8A may be represented using three floats in total, i.e., one float for representing a ratio, one float for representing an offset, and one float for representing a scale, i.e., the number of patterns. One float consists of 4 bytes, and thus the pulse function may be represented with 12 bytes.

FIG. 8B illustrates that patterns of the window region are represented based on the concept of pulse functions as described with reference to FIG. 8A. Referring to FIG. 8B, two pulse functions for a vertical pattern and two pulse functions for a horizontal pattern are required. Two left-side pulse functions of the three pulse functions illustrated on the left-side of the window region are combined into the remaining right-side pulse function. In addition, two lower-side pulse functions of the three pulse functions illustrated in a lower portion of FIG. 8B are combined into the remaining upper-side pulse function.

Thus, four pulse functions, i.e., two for the vertical pattern and two for the horizontal pattern, and two logic functions of combining the two pulse functions for each of the vertical and horizontal patterns are required to represent the window portion. As described above, each of the pulse functions may be represented with 12 bytes, and each of the logic functions may be represented with 1 byte. Thus, the texture of the window region may be represented with 50 bytes in total. In addition, if the window region is represented in colors, 3 bytes in total are required, i.e., 1 byte for each of the R, G, and B color layers.

FIG. 8C illustrates that patterns of the display window region may be represented based on the concept of pulse functions as described with reference to FIG. 8A. Referring to FIG. 8C, one pulse function (12 bytes) for a vertical pattern and two pulse functions (24 bytes) and one logic function (1 byte) for a horizontal pattern are required. Thus, considering color layers (3 bytes), 40 bytes in total are required to represent the display window region.

Finally, in order to generate the exterior texture of the building illustrated in FIG. 7A, 93 bytes in total are required. In addition, 3 bytes for exterior color layers may be further required in order to represent the exterior wall of each building in a different color. In this case, 96 bytes in total are required. However, comparing with a conventional method of generating texture using raster images, which requires 49 Kbytes (128 pixels×128 pixels×3 colors=49,152 bytes), the amount of data may be reduced nearly by 512 times using the building modeling method according to the present disclosure.

In addition, each color layer may be assigned to be different for the day time and the night time, or the generated exterior texture of a building may be combined with the texture of the actual image, in order to represent various images in which a window is open or light from a window is reflected.

Like image files, the method using a combination of pulse functions may be used without limitation, regardless of the texture size. In other words, the method may be applied to texture in various sizes, i.e., 64×64 pixels, 182×182 pixels, or the like.

The method may be effectively implemented using a shader installed in a recently released graphics processing unit (GPU). Only parameters of a pulse function may be transferred to a fragment shader, and the fragment shader may generate and map texture by combining the parameters. Thus, the texture of a building may be rapidly generated.

As described above, since a road is a 2D structure, the road may be represented using conventional 2D map data, without a need to generate 3D images. Thus, a road may be easily represented by loading 2D map data of a conventional 2D navigator, i.e., vector data of road information, and mapping the 2D map data onto terrain polygons.

However, multi-level crossings on elevated roads, tunnels, interchanges, or the like must be represented as 3D images. For this reason, conventional navigation systems represent such crossings as 3D images. However, a large amount of data is required to represent crossings as 3D images.

The present disclosure provides a method of representing crossings having various structures as 3D images using a small amount of data.

Figure 9:
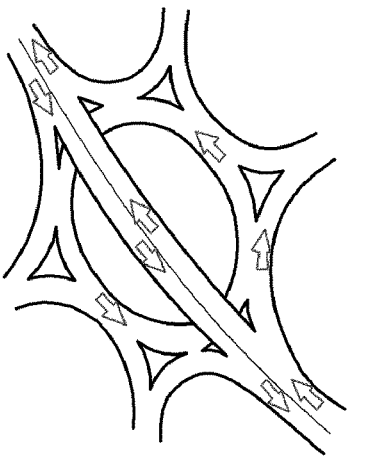
FIG. 9 illustrates examples of crossing model structures used in operation S300 of the method of FIG. 2 according to an embodiment of the present disclosure.
Figure 9:
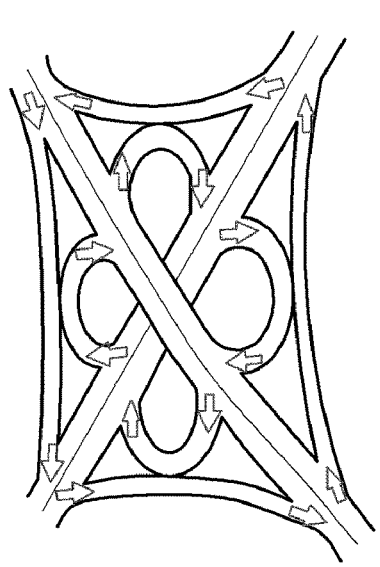
Figure 9:
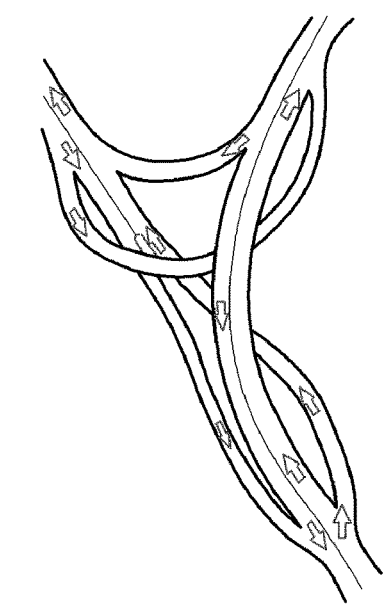
Figure 9:
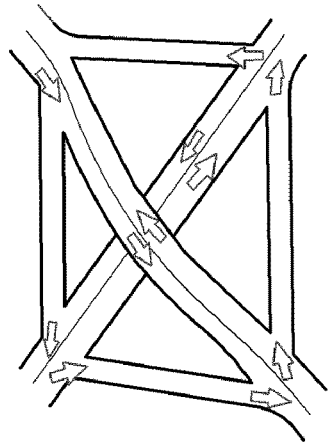
Figure 9:
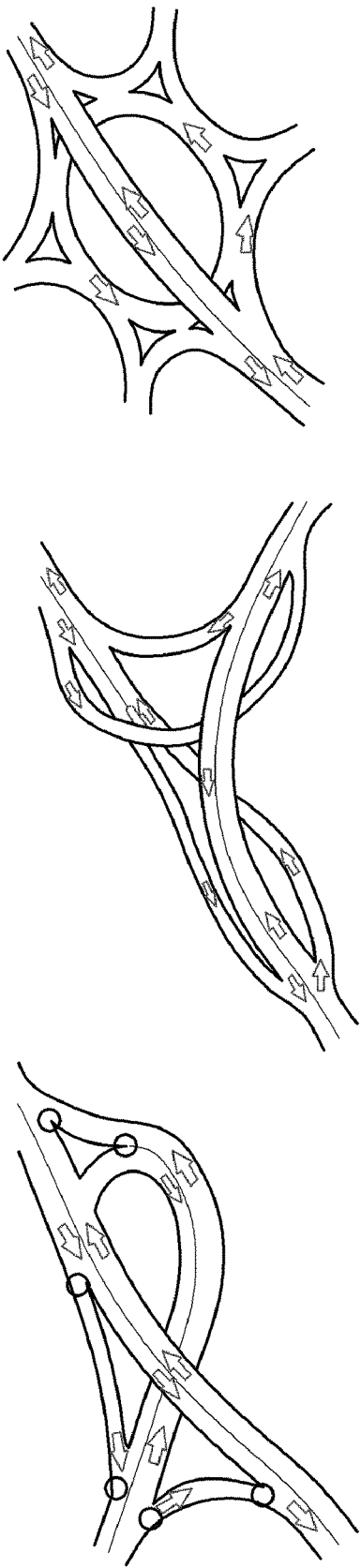
Figure 9:
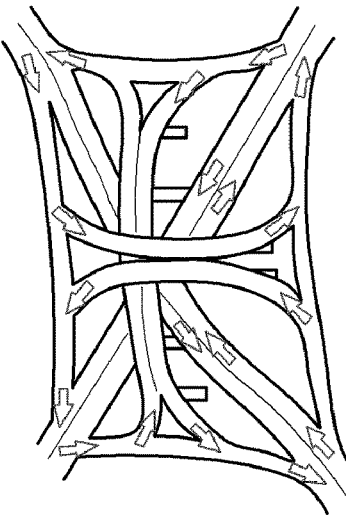

FIG. 9 illustrates examples of crossing model structures used in operation 300 of the method of FIG. 2 according to an embodiment of the present disclosure. Examples of crossing models may include a trumpet crossing, a triangular diverging crossing, a roundabout crossing, a four-level crossing, a diamond crossing, and a clover-leaf crossing. These crossing models are stored in a database as crossing models. In addition, crossing points (denoted by small circles in the trumpet crossing) are stored as control points in vector form.

In addition, a type of crossing is assigned to a crossing of interest in the 2D map data, control points of a stored crossing model that corresponds to the assigned type of crossing are linked to the crossing in the 2D map data, thereby easily generating a 3D crossing. In addition, control points may be adjusted to generate a 3D crossing that is more similar to the actual crossing.

In other words, only several crossing models are generated according to the type of crossing and the number of intersecting roads, and the crossing models may be extended or reduced according to the shape of an actual crossing using control points or may be rotated according to the direction of roads to correspond to the actual crossing. By doing so, most crossings may be represented as 3D graphic images that are similar to the actual crossing.

According to the present disclosure, in a method of generating a 3D crossing, a small amount of data, including an index of a crossing model and the direction and angle of intersecting roads, is used. Therefore, most multi-level crossings may be easily generated as 3D graphic images in real-time, and the performance of navigation systems is improved.

Assuming that crossings in a country, for example, Korea, are classified into about 30 crossing models, if the 30 crossing models are stored along with control points thereof, most of the crossings in the region may be easily represented as 3D images using a small amount of data.

Figures 10, 11:
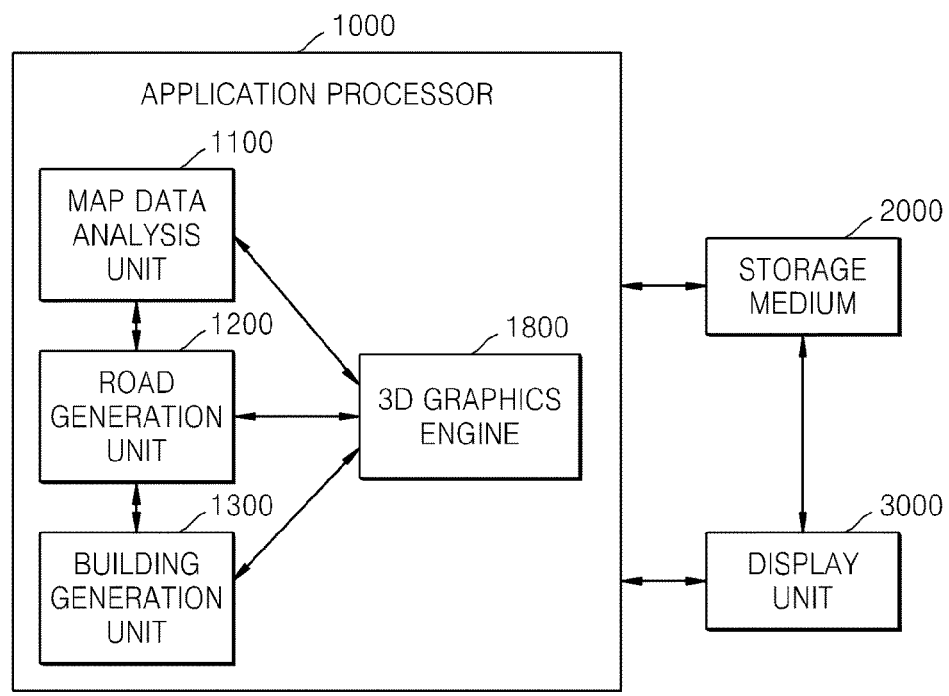
FIG. 10 is a table of data amounts required to represent 3D images for a navigation system in the present disclosure and in a conventional method.
FIG. 11 is a block diagram of a mobile device including an application processor for 3D navigation, according to an embodiment of the present disclosure.

FIG. 10 is a table of data amounts required to represent 3D images for a navigation system in the present disclosure and in a conventional method. In FIG. 10, the "Real 3D Data" column corresponds to the amount of data used in a conventional 3D graphics engine, and the "Virtual 3D Data" column corresponds to the amount of data used to represent 3D graphic images according to the present disclosure. The amount of data used in the present disclosure was calculated with the assumption that a total of 140 buildings in a 600 m×800 m building block region are all simple hexahedrons.

Referring to FIG. 10, when terrain with altitudes is represented as 3D images, only 1 byte of data is required according to the present disclosure, whereas 32 bytes are required in the conventional method, indicating that a smaller amount of data that is 32 times less than that of the conventional method is used in the present disclosure.

In addition, when an exterior of a building is generated as 3D images using a floor plane according to the present disclosure, a smaller amount of data that is 26.75 times less than in the conventional method is used. In addition, when a building is uniformly generated as 3D images using PCM data and R, G, B colors are used, only 144 bytes of data is used, which is about 743 times less than that used in the conventional method.

In addition, when an exterior texture of a building is generated as 3D images, a smaller amount of data that is about 164 times less than in the conventional method is used, as described above with reference to FIG. 8C.

Considering the amounts of data being used in the present disclosure, as described above, for an entire image represented using the 3D image representation method according to the present disclosure, a smaller amount of data that is at least about 30 times less than that of the conventional method may be used. Thus, a 3D navigation system may be implemented in a mobile device.

FIG. 11 is a block diagram of a mobile device including an application processor 1000 for 3D navigation, according to an embodiment of the present disclosure.

Referring to FIG. 11, the mobile device according to the present embodiment includes a storage medium 2000 that stores 2D map data and PCM data, the application processor 1000 that generates 3D image data using data stored in the storage medium 2000, and a display unit 3000 that displays 3D images.

The application processor 1000 includes a map data analysis unit 1100 that analyzes the 2D map data stored in the storage medium 2000 to divide the 2D map data into a road block region and a building block region, a road generation unit 1200 that generates data on roads and crossings in the road block region, a building generation unit 1300 that divides the building block region into sub-blocks in which buildings will be respectively arranged and that generates data on the buildings using the PCM data stored in the storage medium 2000, and a 3D graphics engine 1800, such as OpenGL or DirectX that generates 3D graphics image based on data of a road generation unit 1200 and a building generation unit 1300.

The road generation unit 1200 and the building generation unit 1300 may include modules for performing various functions as described above with reference to FIGS. 4A through 9. That is, the building generation unit 1300 may include a module for dividing the building block region into a plurality of sub-blocks for individual buildings, a module for generating an exterior of a building arranged in each sub-block, a module for generating an exterior texture of the building, and the like.

In addition, instead of a conventional graphics engine, an exclusive graphics engine for executing 3D graphics generation methods according to the present disclosure may be used as the 3D graphics engine 1800.

Although not illustrated, the application processor 1000 may include an image adjustment unit that adjusts 3D images according to the position or the angle of view of a camera, and an altitude representation unit that represents altitudes of the overall terrain using a ROAM (Real-Time Optimally-Adapting Mesh) method.

As described above, an image representation method and apparatus for 3D navigation systems and a mobile device including the image representation apparatus according to the present disclosure may effectively implement 3D navigation using a small amount of data, even when the memory capacity is low as in mobile devices.

In other words, it is possible model terrain and buildings in 3D using a simple algorithm that uses a small amount of data. In addition, a 3D object of a building may be generated without actual texture data, and thus a 3D navigation system may be implemented in a mobile device.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An image presentation method for three-dimensional (3D) navigation, the method comprising:
    loading two-dimensional (2D) map data and pattern control map (PCM) data;
    analyzing the 2D map data;
    generating 3D image data on a region that is analyzed as requiring 3D images in the analyzing of the 2D map data, based on the PCM data; and
    displaying 3D images on a display based on the 2D map data and the 3D image data,
    wherein the PCM data includes data on the distribution of buildings, the density of buildings, the area of a building site, the height of a building, and the type of building, which are generated based on actual geographical information data, and
    wherein the PCM data is obtained from aerial photographs and land registration maps.

2. The method of claim 1, further comprising generating the PCM data based on actual geographical information data before the loading of the 2D map data and the PCM data.

3. The method of claim 1, wherein the analyzing of the 2D map data comprises dividing the 2D map data into a road block region and a building block region, and
    if 3D image data is required on the road block region, in the generating of the 3D image data, 3D image data on a road and a crossing are generated using a crossing model and control points stored in a database, and
    if 3D image data is required on the building block region, in the generating of the 3D image data, 3D image data on a building are generated using the PCM data and a building generation module.

4. The method of claim 3, wherein the crossing model is a 3D crossing model generated to correspond to an actual crossing, and the control points are intersecting points of roads that are used to modify the crossing model,
    if 3D image data on the road and the crossing are generated, a 3D image of the crossing is generated by assigning a type of crossing to the crossing in the 2D map data and linking the crossing in the 2D map data to a crossing model corresponding to the type of crossing in the 2D map data using the control points.

5. The method of claim 3, wherein the generating of the 3D image data comprises:
    dividing the building block region into a plurality of sub-block regions respectively corresponding to individual building sites;

generating the appearance of a building in a sub-block region; and generating an exterior texture of the building.

6. The method of claim 5, wherein the dividing of the building block region comprises:

dividing the building block region into a plurality of sub-blocks in which buildings are to be arranged respectively; and arranging a 3D image of a building in a sub-block.

7. The method of claim 6, wherein the dividing of the building block region into the sub-blocks comprises:

dividing the building block region into the plurality of sub-blocks by repeatedly applying a predetermined rule; and combining a sub-block that is not close to outer sides of the building block region with an adjacent sub-block or removing the sub-block, and the predetermined rule involves choosing the largest side of the building block region and drawing a perpendicular line from a point on the largest side toward an opposite side, said line dividing the largest side in a predetermined ratio, so as to divide the building block region into two sub-blocks.

8. The method of claim 5, wherein, in the generating the appearance of the building, a single planar polygon or a combined polygon of at least two planar polygons is assigned with a predetermined height and modified to generate a 3D building image, and in the generating of the exterior texture of the building, the exterior texture is represented as pulse functions and is generated by combining the pulse functions.

9. The method of claim 5, wherein, if a building arranged in a sub-block region is an index building, a 3D image of the index building is generated based on data on the index building included in the PCM data, and if a building arranged in a sub-block region is not an index building, a 3D image of the building is automatically generated based on data selected from among a predetermined number of set data included in the PCM data.

10. A mobile device comprising:

a storage medium configured to store two-dimensional (2D) map data and pattern control map (PCM) data;

an application processor for three-dimensional (3D) navigation configured to generate 3D image data on buildings using the 2D map data and the PCM data stored in the storage medium; and a display unit configured to display 3D images of the buildings, wherein the PCM data includes data on the distribution of buildings, the density of buildings, the area of a building site, the height of a building, and the type of building, which are generated based on actual geographical information data, and wherein the PCM data is obtained from aerial photographs and land registration maps.

11. The mobile device of claim 10, wherein the application processor for 3D navigation comprises:

a map data analysis unit configured to analyze the 2D map data to divide the 2D map data into a road block region and a building block region;

a road generation unit configured to generate data on roads and crossings in the road block region; and a building generation unit configured to divide the building block region into a plurality of sub-block regions corresponding to individual building sites and generates data on a building in a sub-block region based on the PCM data.

12. The mobile device of claim 11, wherein the road generation unit is configured to generate 3D image data on roads and crossings using a crossing model and control points stored in the storage medium, and the building generation unit is configured to generate 3D image data on buildings using the PCM data and a building generation module.

13. The mobile device of claim 12, wherein the crossing model is a 3D crossing model generated to correspond to an actual crossing, and the control points are intersecting points of roads that are used to modify the crossing model, a 3D image of the crossing is generated by assigning a type of crossing to the crossing in the 2D map data and linking the crossing in the 2D map data to a crossing model corresponding to the type of crossing in the 2D map data using the control points, and the building generation module used to generate the 3D image data comprises:

a block division module configured to divide the building block region into a plurality of sub-blocks by repeatedly applying a predetermined rule, and configured to combine a sub-block that is not close to outer sides of the building block region with an adjacent sub-block or removes the sub-block;

a building appearance generation module configured to generate a 3D image of a building by assigning a single planar polygon or a combined polygon of at least two planar polygons with a predetermined height and modifying the single planar polygon or the combined polygon; and a texture generation module configured to represent the exterior texture of the building as pulse functions and generates the exterior texture of the building by combining the pulse functions.

* * * * *